United States Patent [19]

Tendulkar et al.

[11] Patent Number: 4,600,988
[45] Date of Patent: Jul. 15, 1986

[54] MEMORY-PROGRAMMABLE CONTROL

[75] Inventors: Gautan Tendulkar, Erlangen; Claus Becker, Ötigheim; Wolfgang Richter, Birkweiler, all of Fed. Rep. of Germany

[73] Assignee: Siemens Aktiengesellschaft, Munich, Fed. Rep. of Germany

[21] Appl. No.: 531,771

[22] Filed: Sep. 13, 1983

[30] Foreign Application Priority Data

Sep. 30, 1982 [DE] Fed. Rep. of Germany ....... 3236302

[51] Int. Cl.$^4$ ...................... G06F 13/22; G05B 19/18
[52] U.S. Cl. .................................... 364/200; 364/131
[58] Field of Search ............... 364/131, 132, 133, 134, 364/200 MS File, 900 MS File; 340/825.03, 825.04, 825.05, 825.06, 825.08, 825.5, 825.51; 370/85, 95, 96

[56] References Cited

U.S. PATENT DOCUMENTS

| | | | |
|---|---|---|---|
| 3,363,234 | 1/1968 | Erickson | 364/200 |
| 3,801,962 | 4/1974 | Moore | 364/200 |
| 3,921,146 | 11/1975 | Danco | 364/900 |
| 3,942,158 | 3/1976 | Dummermuth | 364/900 |
| 4,141,066 | 2/1979 | Keiles | 364/200 |
| 4,209,840 | 6/1980 | Berardi | 364/200 |
| 4,266,281 | 5/1981 | Struger | 364/900 |
| 4,467,436 | 8/1984 | Chance | 364/200 |

FOREIGN PATENT DOCUMENTS 10170  9/1979  European Pat. Off. .

OTHER PUBLICATIONS

Horst Huse, "Multi-Mikrocomputer System", Elektronik, 1-29-82, pp. 76-84.
Hermann Schmid, "Multi-Mikroprozessor System", Elektronik, 1-29-82, pp. 87-95.

Primary Examiner—James D. Thomas
Assistant Examiner—Florin Munteanu
Attorney, Agent, or Firm—Kenyon & Kenyon

[57] ABSTRACT

A multiprocessor system having a memory-programmable control of the type having a processor unit, coupling memories and input and output modules for transferring signals to and from a process which is to be controlled. Each processor unit is provided with a subprogram and a data memory which can be accessed directly, and a bus control unit releases access to the common system bus always for only one of the processor units. The access sequence and the access duration of the individual processor units to the common bus, via which the signals run to and from the controlled process, are fixed in a bus assignment matrix. In this manner, simple synchronization of the processor units is achieved. Moreover, guaranteed reaction times with respect to the process are possible. In addition to the duration, sequence, and frequency of the bus access of each processor unit in a bus cycle, the latest number bus window which must be seized by each processor unit can also be monitored by a bus monitoring device, thus insuring that guaranteed reaction times are possible.

2 Claims, 3 Drawing Figures

MEMORY-PROGRAMMABLE CONTROL

BACKGROUND OF THE INVENTION

This invention relates generally to memory-programmable controls for the process cycles of processing machines using multiprocessor systems, and more particularly to a memory-programmable control having processor units, coupling memories and input and output modules, each processor unit having a subprogram and a data memory of its own.

Multiprocessor systems of the type having processor units for coupling memories and input and output modules for signals which are conducted via a common bus, and which have respective subprograms and data memories which can be accessed independently of the common bus, are known to operate in conjunction with a bus control which releases access to the common bus for only one of the processor units at a time. Such multiprocessor systems find application in regulation and control engineering. A detailed description of such systems can be found, for example, in the journal "Elektronik", 1982, pages 76 to 95. If the individual processors have a common bus, the problem of bus assignment always arises. In the known methods, either a processor having the highest priority is given access to the bus, or a processor transfers, after its program has been executed, the common bus to the next bus processor. All such bus assignment systems are relatively uncritical as long as real process on a processing machine does not have to be controlled directly. In such a case, particularly if very fast processes are involved, the correct assignment and synchronization of the individual processors with each other and to the process are relatively elaborate and complicated. Moreover, it is quite difficult to guarantee defined reaction times with respect to certain events in the process.

Freely programmable controls which utilize microprocessors are well known and are utilized for controlling processing machines. In such controls, the output signals which are required for the process are made available from the measured input signals in accordance with a cyclically executed program. Such controls are described, for example, in Siemens-Zeitschrift "Energietechnik" 1982, no. 2, pages 54 to 57, or Siemens "Energietechnik" 1979, pages 136 to 139, Siemens-Zeitschrift 1979, pages 43 to 47, European Patent Application No. 10 170, DE-AS No. 25 00 320, and U.S. Pat. Nos. 3,921,146 or 3,942,158.

Some of these known programmable controls do not operate directly with the input and output signals, but rather with a so-called process image. In such systems, the programmable oontrols operate at the beginning of each processing cycle, at which time the input signals are interrogated and recorded in a data memory. The user program then operates with the stored data and generates the output signals therefrom. The stored output signals are issued at the end of the processing cycle to the associated output modules for the process. A control of this type is described, for example, in the above-mentioned European Application No. 10 170.

It is, therefore, an object of this invention to provide a simple freely programmable control for use in multiprocessor technology with which simple synchronization of the individual processor units with each other and with respect to bus access is possible, and with which defined reaction times can be guaranteed.

SUMMARY OF THE INVENTION

The foregoing and other objects are achieved by this invention which provides a memory-programmable control for the process cycle in a processing machine, the control using a multiprocessor system having a processor unit, coupling memories and input and output modules for the transferring of signals to and from the process via a common system bus. Each such processor utilizes a subprogram and data memories which can be accessed directly. A bus control releases access to the common system bus for one of the processor units. In accordance with the invention, the access sequence of the processor units and the respective access duration of the common bus can be stored as a selectable integral multiple of a basic clock frequency in a memory of the bus control. Such stored values serve for generating corresponding bus release signals for each scanning of a bus cycle which consists of a predetermined number of base pulses.

The foregoing control system affords simple synchronization of the bus access and affords matching of the synchronized bus access to the process. In addition to the duration, sequence, and frequency of the bus access of each processor unit in a bus cycle, the latest number bus window which must be seized by each processor unit can also be monitored. In this manner, the maintenance of guaranteed reaction times can be monitored.

In one embodiment, the bus control is advantageously included as a portion of a communication processor which is similarly connected to the common bus. The modular equipment described hereinabove with the individual processor units and the communication processor can be combined in a common structural unit and accommodated within a housing.

BRIEF DESCRIPTION OF THE DRAWINGS

Comprehension of the invention is facilitated by reading the following detailed description in conjunction with the annexed drawings, in which.

DETAILED DESCRIPTION

Figure 1:
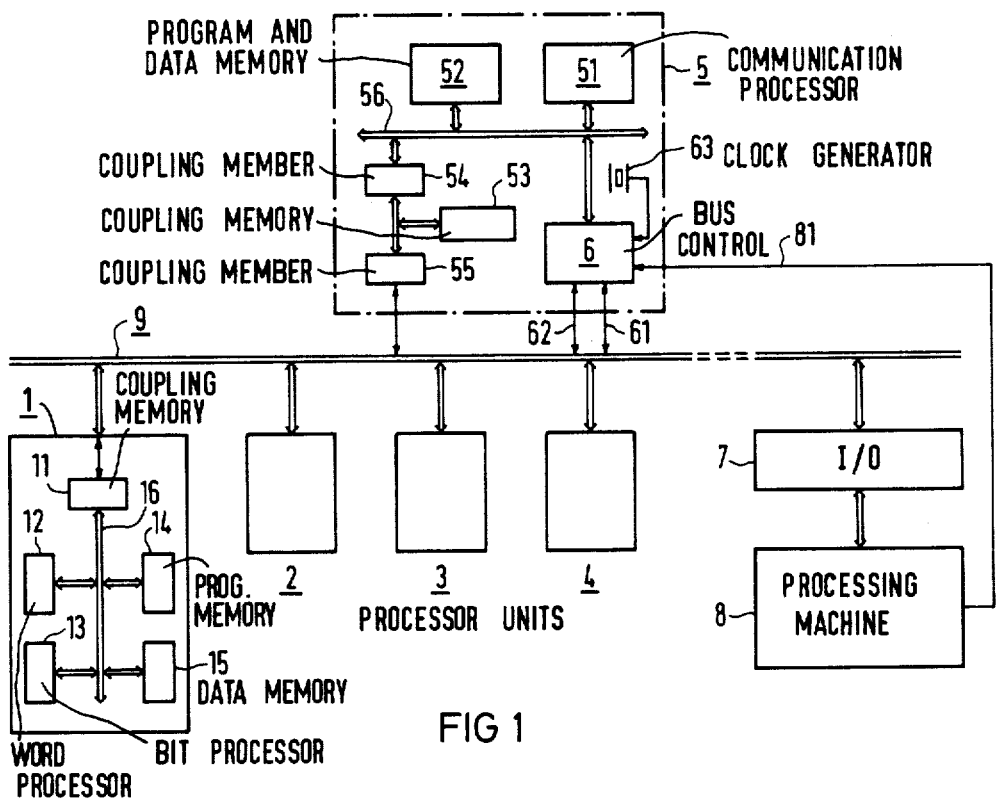
FIG. 1 is a block and line representation of the system architecture of a multiprocessor system constructed in accordance with the principles of the invention.

FIG. 1 is a block and line representation of a modular multiprocessor automation system having a communication processor unit 5 and any desired number of control and/or regulator processor units. In the specific illustrative embodiment, four identical regulator or control processor units 1 to 4 are provided. All processor units 1 to 5 are connected via a common system bus 9 to one another. An input and output module 7 for a processor machine 8 is also connected to system bus 9, and optionally also to further peripheral modules (not shown). The processors which are assigned to processor unit 1, in the present embodiment, include a word processor 12 and a bit processor 13 which can communicate via a local bus 16 with a user program memory 14 and a data memory 15. Each such processor can process a program autonomously and without influencing the other processor units. Access via the coupling memory 11 to external system bus 9 is necessary only for exchanging or reading-in the states of the signals in input and output module 7 and/or the content of common coupling memory 53 in communication processor unit 5. This also applies to processor units 2 to 4.

Communication processor unit 5 is provided with a program and data memory 52 and a bus control 6 having an adjustable clock generator 63, in addition to coupling memory 53 which is coupled via coupling member 55 to common system bus 9. Communication processor unit 5 similarly has a local bus 56 of its own which can be connected to common system bus 9 via coupling members 54 and 55.

The access of individual processor units 1 to 4 to common system bus 9 is controlled by bus control 6. For sake of simplicity, this is shown in such a manner that control lines 62 from bus control 6 address system bus 9 accordingly. If the respective processor unit has received the bus release signal according to the programmed bus assignment, the completed access to common system bus 9 must be acknowledged to bus control 6 via line 61 within a predetermined time. Communication processor 5 can additionally stop control processor units 1 to 4 via a stop signal, or release them by cancelling the stop signal.

The bus assignments in each bus cycle is controlled either dependent upon the machine clock frequency, or by an internal clock generator. For this purpose, a clock signal is derived from processor 8 in the first case, for example, as indicated by line 81. This clock signal may, for example, be proportional to the speed of the main drive shaft of the processing machine. In any event, it should always be a signal to which the other changes of the process cycle in the processing machine can be referred. Alternatively, the basic clock frequency can also be generated by an internal clock generator 63. This then makes guaranteed reaction times possible.

The clock frequency supplied by clock generator 63 can be set individually by the user. To each processor unit 1 to 4, an integral multiple $n_i$ of the basic clock frequency T is assigned for a certain time $T_i$ (where i=1 to 4) as the bus access time:

$$T_i = n_i T$$

Moreover, the sequence and frequency of the bus access of each processor unit in a bus cycle which includes a scanning of the bus assignment matrix, is fixed. This bus assignment matrix, which is shown in FIG. 2 as signals (g) to (k), is stored in communication processor unit 5 and is evaluated accordingly by bus control 6.

Figure 2:
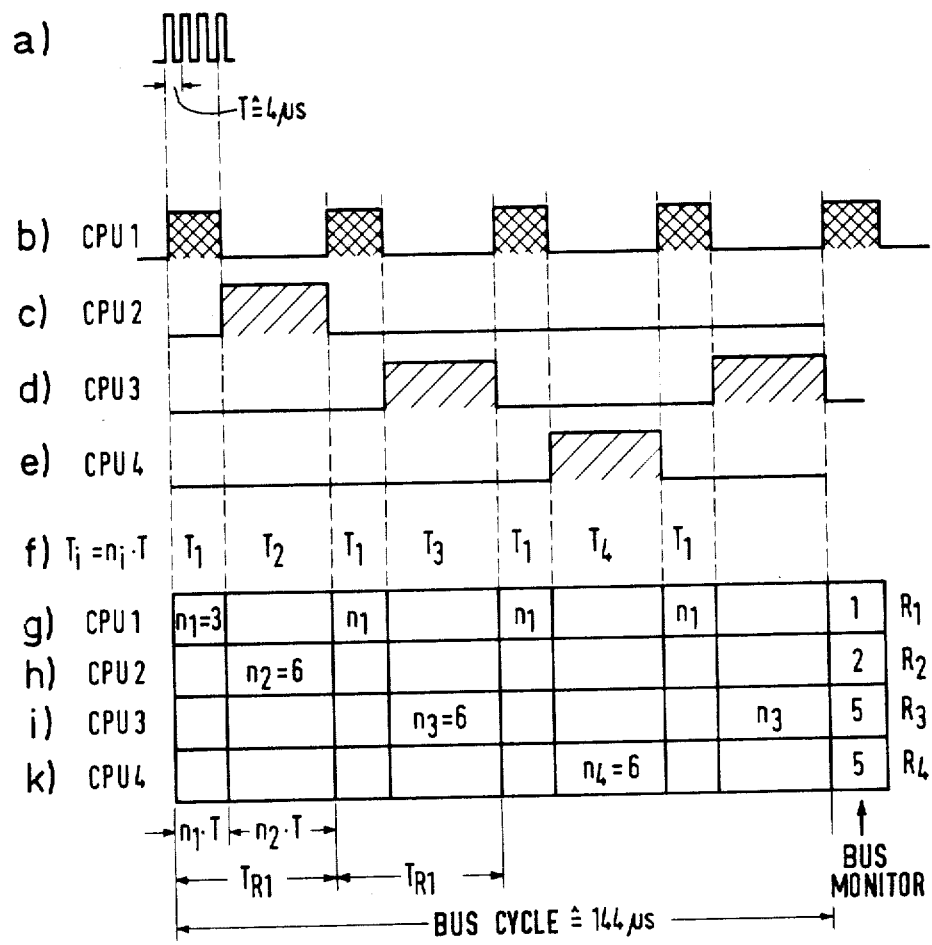
FIG. 2 is a timing diagram showing the timing correlation of the bus assignments and the bus access of the individual processor units.

The basic clock signal T is shown in signal (a) of FIG. 2. The bus access time $T_i$ of each processor unit 1 to 4 and the spacings of the bus releases of each processor unit are made dependent upon the basic clock cycle T. As can be seen, for example, from signal (b) wherein the bus release duration for processor unit 1 is given, this processor unit is given access to common system bus 9 in the time intervals $T_i$ (signal (g)). After refreshing the respective image via system bus 9, processor unit 1 processes its user program independently of the adjacent processor units. After the program processing has been completed, processor unit 1 branches into a waiting loop until the next bus release in the time interval $T_1$. The same applies to the other processor units 2–4, the bus assignments of which are shown with the intervals $T_2$ to $T_4$ as signals (c) to (e) of FIG. 2.

The times $T_1$ to $T_4$ for the system bus assignment depend upon the number of inputs and outputs and coupling flags which must be refreshed per processing cycle. It is ensured by the predetermined bus assignment matrix that specified reaction times can be maintained by each processor unit.

Figure 3:
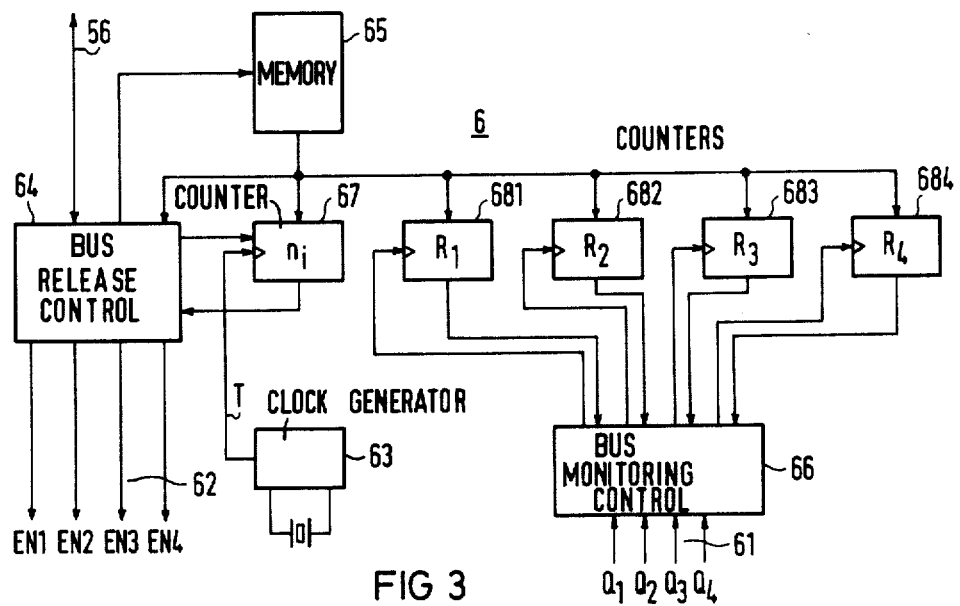
FIG. 3 is a block and line representation of the circuit details of the bus control.

FIG. 3 is a block and line representation of bus control 6 which contains a bus release control 64 which furnishes the individual bus releases $EN_1$ to $EN_4$ on lines 62, for individual processor units 1 to 4, a memory 65, and a counter 67 which is clocked by a clock generator 63. Additionally provided is a monitoring device which will be explained hereinbelow. As noted, each processor unit 1 to 4 is assigned $n_i$-times of the basic clock T for a time $T_i$ as the bus access time. This can be expressed as:

$$T_i = n_i T$$

The values of n can be loaded as numerical values into memory 65 by the user. Therefrom results, for example, for the example according to FIG. 2, an assignment $T_i = n_i T$, and simultaneous fixation of the sequence of the accesses according to the following storage arrangement:

n1=3
n2=6
n1=3
n3=6
n1=3
n4=6
n1=3
n3=6

The data $n_i$ are fetched by bus release control 64 sequentially from memory 65 and respectively inserted into counter 67. The latter is then counted down to the value zero with the basic clock T. Then, the individual bus release times $T_1$ to $T_4$ are obtained by corresponding reports of the counter reading of counter 67 to bus release control 64. This bus assignment matrix is repeated each time at the conclusion of a bus cycle which, in the present example, may be 144 μ sec. In this specific embodiment, the value $n_1 = 3$ is therefore initially set into counter 67 at the beginning of the bus cycle and at the same time, processor unit 1 associated with value $n_1$ is switched to common system bus 9 by release signal $EN_1$. If counter 67 has arrived at zero by the pulses T, bus release control 64 inhibits bus release for processor unit 1. The same then applies for the other processor units, the occupation scheme of which can be seen from the bus assignment matrix according to FIG. 2. In addition, bus control 6 further monitors which number bus window must be seized at the latest for access by each processor unit 1 to 4. The values $R_1$ to $R_4$ for the individual processor units 1 to 4 are, for example, as follows:

| R1 = 1 | R3 = 5 |
| R2 = 2 | R4 = 5 |

This means that processor unit 1 must engage the bus in each bus release interval and must thereby service the process; processor unit 2 must also access the bus in every second possible bus access; etc. Thus, the reaction times of the central units on the process can be monitored.

This scheme can be embodied in a circuit configured in accordance with FIG. 3 by providing that individual values $R_1$ to $R_4$ are set into counters 681 to 684, and these counters are counted down by bus monitoring control 66 for each corresponding bus release of the associated processor unit. In the acknowledgement $Q_1$ to $Q_4$ of the corresponding bus access on line 61, counters 681 to 684 are always reset to the starting value. If the acknowledgement signal fails to arrive within the predetermined reaction time, the counter in question goes to the zero value after the last bus assignment and thereby the predetermined reaction time is exceeded. In the present case, the monitored system times $T_R$ for processor units 1 to 4 are as follows:

Processor unit 1:

$T_{R1} = (n_1 + n_2) \, T \, R_1 = (n_1 + n_3) \, T \, R_1 = (n_1 + n_4) \, T$
$R_1 = 36 \, \mu \text{ sec.}$ Processor unit 2:

$T_{R2} = (n_2 = 4n_1 + 2n_3 + n_4) \, T \, R_2 = 288 \, \mu \text{ sec.}$

Processor unit 3:

$T_{R3} = (n_3 + 2n_1 + n_4) \, T \, R_3 = (n_3 + 2_{n1} + n_2) \, T$
$R_3 = 360 \, \mu \text{ sec.}$ Processor unit 4:

$T_4 = (4n_1 + 2n_3 + n_2 + n_4) \, T \, R_4 = 720 \, \mu \text{ sec.}$

Further monitoring can be performed within the above-mentioned controls. If, for example, a necessary bus release is not utilized, a flag can be set in coupling memory 65 which can be recognized by the next processor unit. The latter can then either deliver a fault indication or take over the output commands in case two computers operate in parallel for reasons of safety. Redundant and safety-oriented systems can therefore be realized relatively simply in this manner.

It should further be noted that the assignment lists of individual processor units 1 to 4 to input and output module 7 can be stored in coupling memory 53 of communication processor unit 5. Moreover, the signal transmission rules between the processor can also be stored therein, including control and other parameters which may be variable.

If required, only a single processor unit may be used. In such a case, the system corresponds to conventional programmable control equipment. The sequential bus release is then merely replaced by a permanent release.

Although the invention has been disclosed in terms of specific embodiments and applications, persons skilled in the art, in light of this teaching, can generate additional embodiments without exceeding the scope or departing from the spirit of the claimed invention. The drawings and descriptions in this disclosure are proffered to facilitate comprehension of the invention and should not be construed to limit the scope thereof.

What is claimed is:

1. A memory-programmable controller for controlling the process cycle of a processing machine operating a process, the controller comprising a multiprocessor system having a master communications processor unit and a plurality of individual processor units, each processor unit including a coupling memory, each coupling memory coupling a respective processor unit to a common system bus, and further comprising input/output means coupled to said common system bus for transferring signals from the common system bus to and from the processing machine, said communications processor unit controlling the transfer of signals between the processor units and said processing machine, each processor unit further comprising subprogram memory means and data memory means which can be accessed directly by said communications processor unit, said communications processor unit comprising means for controlling the access of said processor units to the common system bus, said means for controlling comprising bus control unit means for providing access to the common system bus by only one of the processor units at a time, said bus control unit means comprising memory means having stored therein the access sequence of said processor units and the respective access duration times of the processor units to the common system bus, said access duration times comprising selectable integral multiples of a basic clock period, and further comprising means responsive to said stored access sequence and duration times for scanning a bus cycle, said bus cycle comprising a predetermined number of basic clock periods, and means for generating bus release signals, said bus release signals being coupled to respective ones of said processor units for providing access by said respective processor units to the common system bus during said bus cycle and further comprising means for monitoring the number of times the common system bus has been accessed by each processor unit within a predetermined number of bus release signals, said monitoring means comprising counter means for counting out respective predetermined periods of time for each of said processor units.

2. The memory-programmable controller recited in claim 1, further comprising clock generator means for generating clock pulses having said basic clock period, said clock generator means comprising a clock generator contained in said bus control unit means or means contained in said processing machine.

* * * * *